H. B. ROBINSON.
HOSE COUPLING.
APPLICATION FILED MAR. 14, 1916.
1,236,364.
Patented Aug. 7, 1917.
2 SHEETS—SHEET 1.
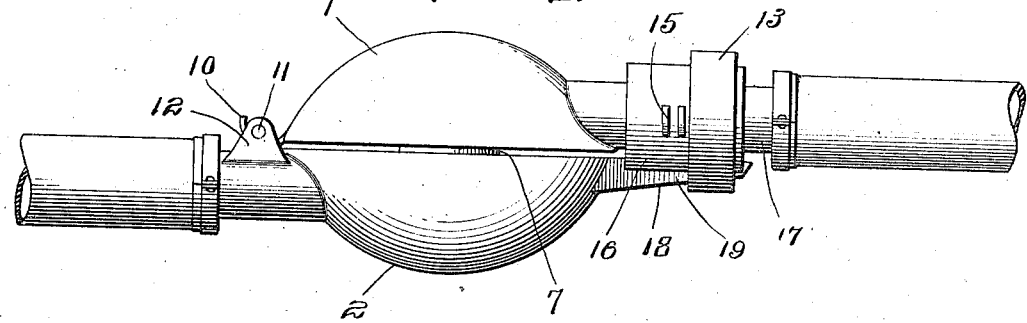
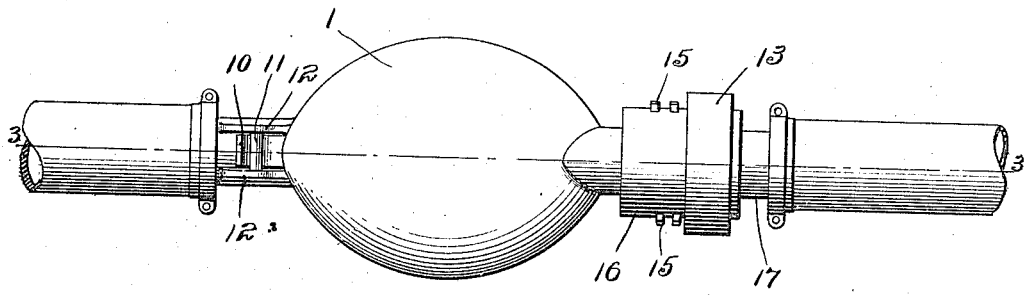
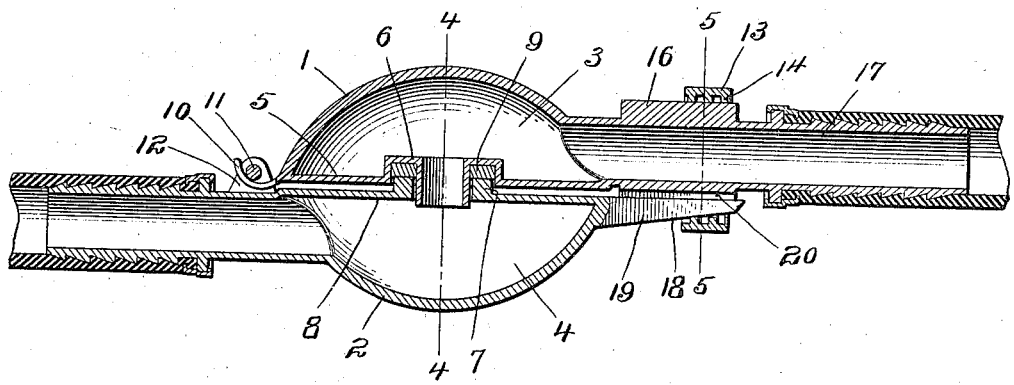
Witnesses
A. C. Newkirk
Wm. R. Smith
Inventor
H. B. Robinson
By Victor J. Evans
Attorney H. B. ROBINSON.
HOSE COUPLING.
APPLICATION FILED MAR. 14, 1916.
1,236,364.
Patented Aug. 7, 1917.
2 SHEETS—SHEET 2.
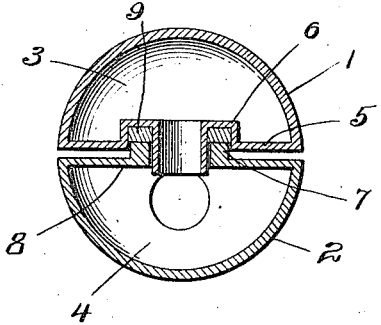
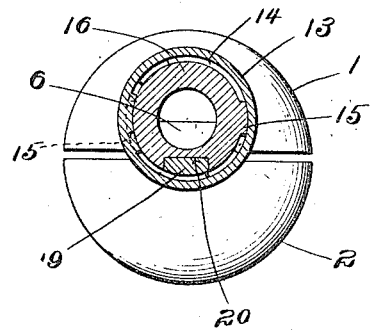
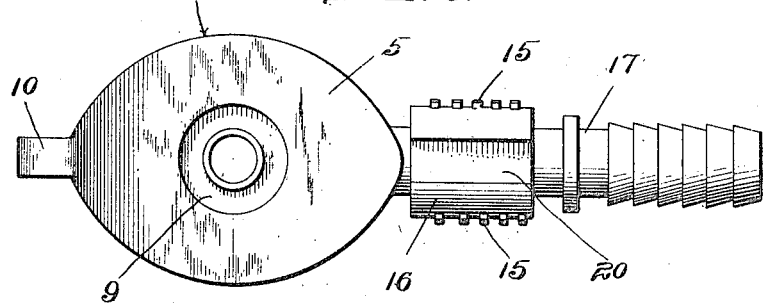
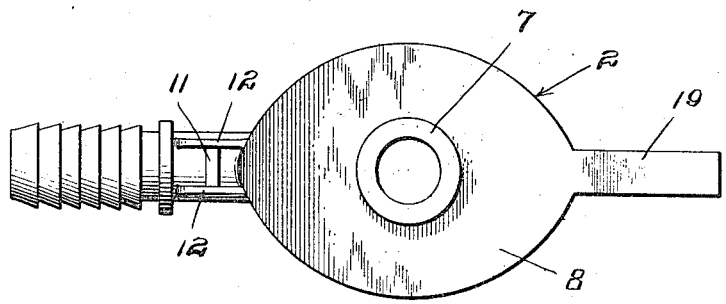
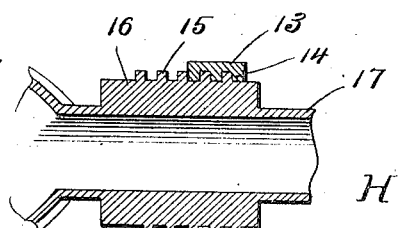
Witnesses
A. C. Newkirk
Wm R. Smith
Inventor
H. B. Robinson
By Victor J. Evans
Attorney

UNITED STATES PATENT OFFICE.

HARRY B. ROBINSON, OF MUSKEGON, MICHIGAN.

HOSE-COUPLING.

1,236,364.  Specification of Letters Patent.  Patented Aug. 7, 1917.

Application filed March 14, 1916. Serial No. 84,158.

*To all whom it may concern:*

Be it known that I, HARRY B. ROBINSON, a citizen of the United States, residing at Muskegon, in the county of Muskegon and State of Michigan, have invented new and useful Improvements in Hose-Couplings, of which the following is a specification.

This invention relates to a hose coupling and has for its primary object to provide a structure in which the parts are so related that the usual gasket ring may be composed of any yieldable material and readily put under compression.

An object of the invention is to provide means for effectively bringing the sections together in a direction to readily compress the gasket with a minimum amount of movement.

Another object of the invention is to so construct the sections that a gasket of relatively small area may be used.

A further object of the invention is to provide a construction that can be readily connected and disconnected and in which the parts are so proportioned as to readily withstand the rough usage to which devices of this character are subjected.

With these and other objects in view, the invention consists in the construction, combination and arrangement of parts as will be hereinafter more fully described, illustrated in the accompanying drawings and pointed out in the claim hereunto appended.

In the drawings:—

Figure 1 is a side elevation of the coupling shown connecting the hose sections of an air brake system.

Fig. 2 is a top-plan view thereof.

Fig. 3 is a longitudinal sectional view on the line 3—3 of Fig. 2.

Fig. 4 is a cross section on the line 4—4 of Fig. 3.

Fig. 5 is a cross section on the line 5—5 of Fig. 3.

Fig. 6 is a bottom plan view of one of the sections.

Fig. 7 is a plan view of the other section.

Fig. 8 is an enlarged longitudinal sectional view illustrating the connection between the adjustable nut and the sections.

Referring to the drawings I have shown the parts so arranged that the sections 1 and 2 assume an upper and lower position respectively and throughout the specification the sections will be described as an upper and lower section so as to distinguish the two.

Each of the sections is made hollow so as to form a chamber 3 in the upper section 1 and a chamber 4 in the lower section 2. The sections 1 and 2 are substantially semi-circular in longitudinal section and the flat wall 5 of the section 1 is formed with an annular depression 6 in which is positioned an annular rib 7 formed on the flat wall 8 of the section 2. Arranged in the depression 6 is a gasket 9 of any suitable compressible material and at this point, I wish to call attention to the fact that the coöperation between the rib and wall of the depression 6 is such that the usual rubber gasket may be dispensed with thus doing away with the inherent disadvantages of rubber. The upper section 1 is further provided with a hook 10 adapted to engage a pin 11 carried by the ears 12 formed integral with the section 2. From this arrangement it will be seen that the sections can be moved away from each other about the pin 11.

I will now describe the device for putting the gasket under pressure when the sections have been moved about the pin 11 until the rib and gasket engage each other. This device comprises a nut 13 formed with thread sections 14 adapted to coöperate with thread sections 15 upon the enlargement 16 formed upon the nipple 17 of the section 1.

This nut coöperates with the incline surface 18 of a projection 19 formed integral with the section 2 and shown seated in a slot 20 formed in the section 1.

From the foregoing description it will be seen that the sections can be readily moved toward each other about the pin 11 after which the nut 13 will be rapidly adjusted for giving further movement of the sections toward each other for compressing the gasket.

From the foregoing description taken in connection with the accompanying drawings, it should be apparent that I provide a device which is admirably adapted for the purpose for which it is intended, that the device is simple, durable and efficient of construction and that the device may be manufactured and sold at a comparatively low cost.

What I claim is:—

A hose coupling comprising two hollow sections having a pin and hook connection with each other one of said sections being formed with an annular depression and a series of thread sections, the other section being provided with an annular rib arranged in said depression and a tapering projection, a gasket positioned between the rib and wall of the depression and a nut adjustably engaging said thread sections and said projection for moving said sections in a direction to compress said gasket.

In testimony whereof I affix my signature in presence of two witnesses.

HARRY B. ROBINSON.

Witnesses:
BENJ. H. TELLMAN,
A. MICHELSON.

Copies of this patent may be obtained for five cents each, by addressing the "Commissioner of Patents, Washington, D. C."